United States Patent
Mc Donald

(10) Patent No.: US 7,089,736 B2
(45) Date of Patent: Aug. 15, 2006

(54) VARIABLE NOZZLE TURBO (VNT) SOLENOID TEMPERATURE ESTIMATOR

(75) Inventor: Mike M. Mc Donald, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/899,978

(22) Filed: Jul. 27, 2004

(65) Prior Publication Data

US 2006/0021345 A1    Feb. 2, 2006

(51) Int. Cl.
| F02D 23/00 | (2006.01) |
| H01H 47/26 | (2006.01) |
| H01H 47/00 | (2006.01) |
| H01H 35/00 | (2006.01) |
| G01R 31/02 | (2006.01) |
| G08C 19/12 | (2006.01) |
| G01M 19/00 | (2006.01) |
| H01H 50/12 | (2006.01) |
| H01H 47/24 | (2006.01) |
| G01R 7/00  | (2006.01) |
| G08C 19/16 | (2006.01) |

(52) U.S. Cl. ............. 60/602; 361/161; 361/140; 324/760; 324/105; 340/870.17; 340/644; 73/118.1; 307/117

(58) Field of Classification Search ......... 60/600–603; 335/217; 361/140, 161, 103, 154–158; 307/117; 324/760, 105; 340/870.17, 644; 73/118.1
See application file for complete search history.

(56) References Cited

U.S. PATENT DOCUMENTS

| 2,920,248 | A | * | 1/1960 | Matthews | 361/140 |
| 3,939,403 | A | * | 2/1976 | Stassart | 361/140 |
| 4,656,400 | A | * | 4/1987 | Pailthorp et al. | 361/154 |
| 4,980,793 | A | * | 12/1990 | Glowczewski et al. | 361/154 |
| 5,089,930 | A | * | 2/1992 | Chass | 361/140 |
| 5,384,676 | A | * | 1/1995 | Yokoyama et al. | 360/77.13 |
| 5,610,453 | A | * | 3/1997 | Smith | 307/117 |
| 5,778,329 | A | * | 7/1998 | Officer et al. | 60/602 |
| 5,942,892 | A | * | 8/1999 | Li | 324/207.16 |
| 6,061,224 | A | * | 5/2000 | Allen | 361/154 |
| 6,134,889 | A | * | 10/2000 | Markyvech et al. | 60/602 |
| 6,418,719 | B1 | * | 7/2002 | Terry et al. | 60/602 |
| 6,427,445 | B1 | * | 8/2002 | Isaac et al. | 60/602 |
| 6,565,064 | B1 | * | 5/2003 | Smith et al. | 251/129.04 |
| 6,679,057 | B1 | * | 1/2004 | Arnold | 60/602 |
| 6,700,762 | B1 | * | 3/2004 | Underwood et al. | 361/111 |
| 6,755,078 | B1 | * | 6/2004 | Hernandez et al. | 73/118.1 |
| 6,873,514 | B1 | * | 3/2005 | Maller et al. | 361/160 |
| 6,895,751 | B1 | * | 5/2005 | Greentree | 60/602 |

FOREIGN PATENT DOCUMENTS

| FR | 2641405 A1 | * | 7/1990 |
| JP | 2002004897 A | * | 1/2002 |
| JP | 2003042330 A | * | 2/2003 |
| JP | 2004300987 A | * | 10/2004 |

* cited by examiner

Primary Examiner—Thai-Ba Trieu
(74) Attorney, Agent, or Firm—Christopher DeVries

(57) ABSTRACT

A method of creating a solenoid temperature estimator includes operating a solenoid based on a data point including a plurality of operating parameters and determining a temperature of the solenoid. The method further includes recording steady-state values for the temperature and each of the plurality of operating parameters and generating the solenoid temperature estimator based on the steady-state values.

19 Claims, 5 Drawing Sheets

US 7,089,736 B2

VARIABLE NOZZLE TURBO (VNT) SOLENOID TEMPERATURE ESTIMATOR

FIELD OF THE INVENTION

The present invention relates to variable nozzle turbos (VNTs), and more particularly to a VNT solenoid temperature estimator.

BACKGROUND OF THE INVENTION

Internal combustion engines combust an air and fuel mixture within cylinders of the engine to produce drive torque. Engines can include a turbocharger that increases torque output by delivering additional air into the cylinders. One traditional turbocharger includes a variable nozzle turbo (VNT). VNT's include variable position vanes that regulate the amount of air delivered through the VNT. The vane position ranges from a fully-open position to a fully-closed position. In the fully-open position, the VNT delivers a minimum amount of air to the engine. In the fully-closed position, the VNT delivers a maximum amount of air to the engine. The vanes can be positioned between the fully-open and fully-closed positions to provide an intermediate amount of air to the engine. A vane solenoid adjusts the vane position based on a control signal and a vane position sensor generates a signal indicating the actual vane position for feedback control.

In general engine components, such as the vane solenoid, are affected by temperature. Traditionally, temperature sensors are incorporated at or near critical engine components to monitor temperature. In components such as VNTs, including a temperature sensor increases cost (e.g., cost of the sensor itself, wiring, packaging, etc.) and complexity. Further, because such components normally do not include temperature sensors, temperature based diagnostics and/or remedial actions are not included in traditional engine control systems.

SUMMARY OF THE INVENTION

Accordingly, the present invention provides a turbo system including a solenoid that is regulated based on a current signal to adjust an output of the turbo system. A driver module generates the current signal. The current signal is based on a commanded duty cycle signal, a voltage signal and an effective electrical impedance of the solenoid. A temperature estimator module estimates a temperature of the solenoid based on the current signal, the voltage signal and the commanded duty cycle signal.

In one feature, the turbo system further includes a voltage reading module that generates the voltage signal based on a voltage supply to the turbo system.

In another feature, the turbo system further includes a current reading module that measures the current signal.

In another feature, the turbo system further includes a filter that filters the voltage signal prior to processing of the voltage signal by the temperature estimator module.

In another feature, the turbo system further includes a filter that filters the duty cycle signal prior to processing of the duty cycle signal by the temperature estimator module.

In another feature, the turbo system further includes a filter that filters the current signal prior to processing of the current signal by the temperature estimator module.

In still another feature, the temperature estimator module implements a look-up table to determine the temperature.

In an alternative feature to the look-up table, the temperature estimator module can implement a multi-variable equation to determine the temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
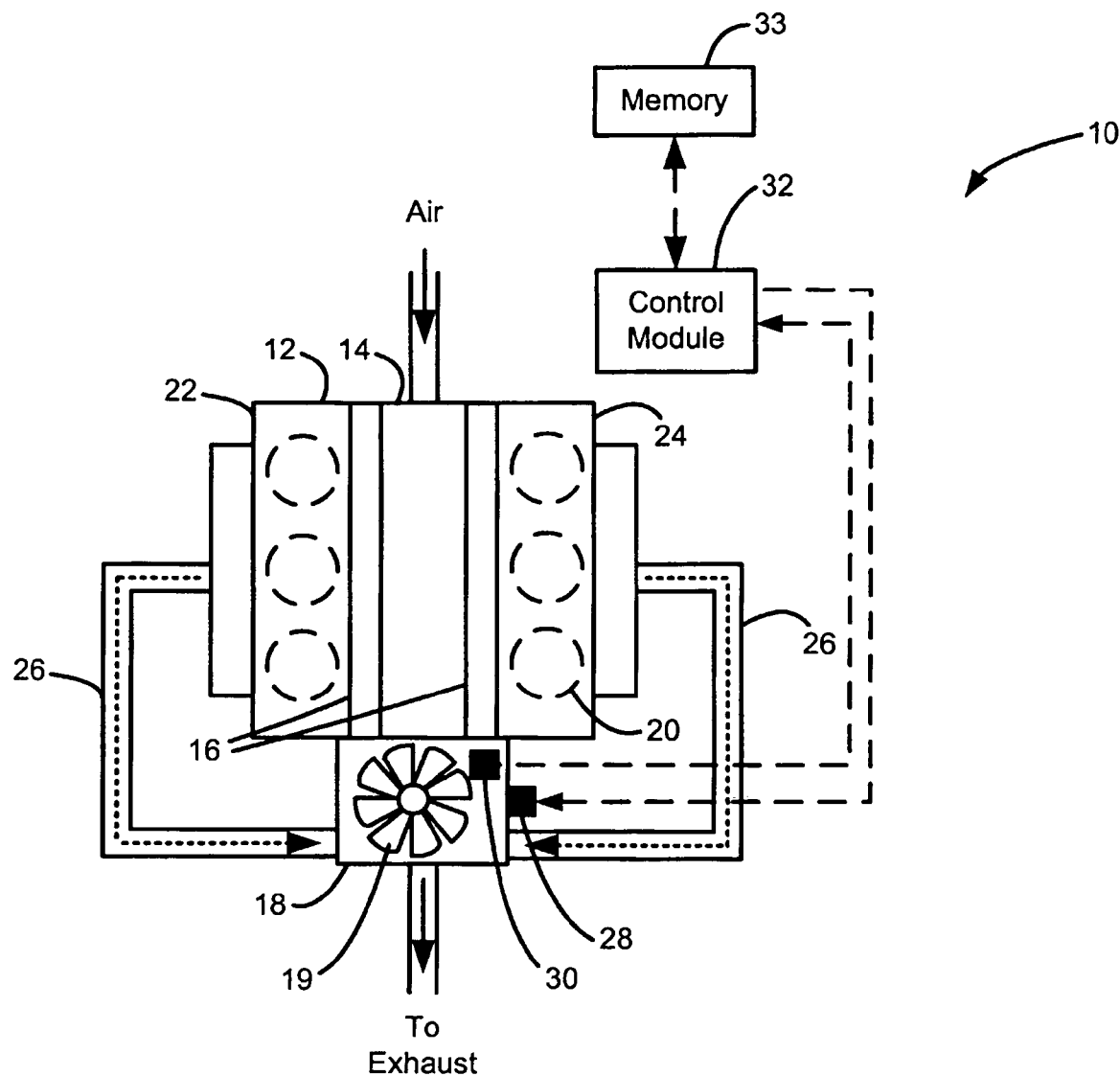
FIG. 1 is a schematic illustration of a vehicle engine system including a variable nozzle turbo (VNT) according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine system 10 is schematically illustrated in accordance with the present invention. The engine system 10 includes an engine 12, an intake manifold 14, a fuel injection system 16 and a turbocharger 18. The exemplary engine 12 includes six cylinders 20 configured in adjacent cylinder banks 22,24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration.

Air is drawn into the intake manifold 14 by the inlet vacuum created by the engine intake stroke. Air is drawn into the individual cylinders 20 from the intake manifold 14 and is compressed therein. Fuel is injected by the injection system 16 and is mixed with air. The air/fuel mixture is compressed and the heat of compression and/or electrical energy ignites the air/fuel mixture. Exhaust gas is exhausted from the cylinders 20 through exhaust conduits 26. The exhaust gas drives the turbocharger 18, which delivers additional air into the cylinders 20 for combustion.

The turbocharger 18 is preferably a variable nozzle turbocharger (VNT). The turbocharger 18 includes a plurality of variable position vanes 19 that regulate the amount of air delivered. More specifically, the vanes are movable between a fully-open position and a fully-closed position. When the vanes are in the fully-closed position, the turbocharger 18 delivers a maximum amount of air into the engine 12. When the vanes are in the fully-open position, the turbocharger 18 delivers a minimum amount of air into the engine 12. The amount of delivered air is regulated by selectively positioning the vanes between the fully-open and fully-closed positions. The turbocharger 18 includes a vane solenoid 28 that manipulates a flow of hydraulic fluid to a vane actuator (not shown). The vane actuator adjusts the position of the vanes. A vane position sensor 30 generates a vane position signal based on the physical position of the vanes.

A control module 32 controls overall operation of the engine system 10. More specifically, the control module 32 controls engine system operation based on various parameters including, but not limited to, driver input, stability control and the like. The control module 32 can be provided as an Engine Control Module (ECM). The control module 32 regulates operation of the turbocharger 18 by regulating current to the vane solenoid 28. The control module 32 determines a vane solenoid temperature estimate ($T_{EST}$) based on the solenoid temperature estimator of the present invention. The control module 32 performs VNT diagnostics and initiates remedial action based on $T_{EST}$, as discussed in further detail below.

Figure 2:
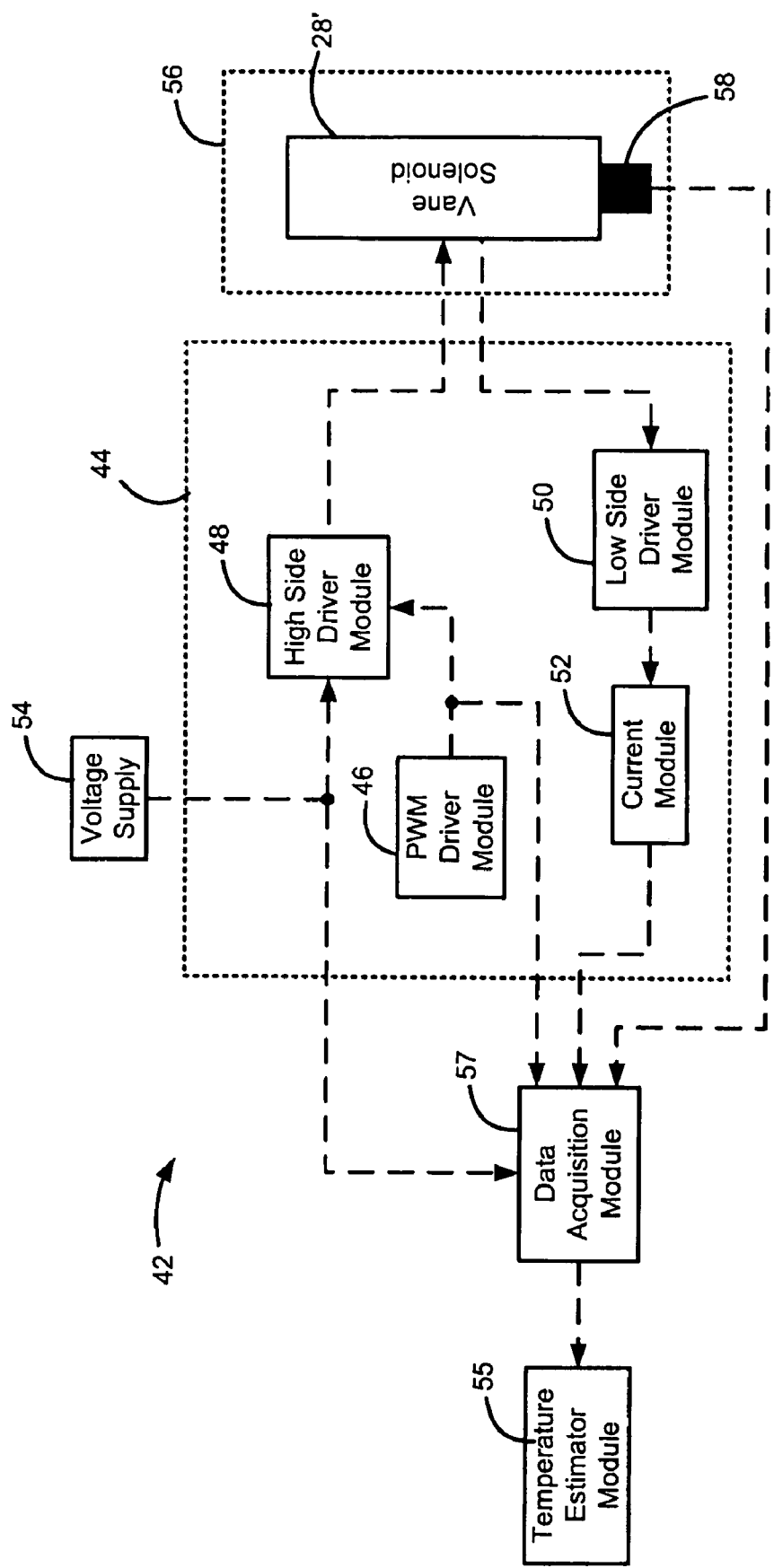
FIG. 2 is a block diagram schematically illustrating a lab-based solenoid driver system that is used to create a solenoid temperature estimator according to the present invention.

Referring now to FIG. 2, the solenoid temperature estimator is created off-line in a laboratory setting using a temperature estimator system 42. More particularly, a lab-based solenoid driver 44 is provided and includes a pulse-width modulated (PWM) driver module 46, a high side driver module 48, a low side driver module 50 and a current module 52. A voltage supply 54 supplies a voltage ($V_{SUPPLY}$) to the lab-based solenoid driver 44, which generates a PWM current signal to a lab-based vane solenoid 28'. A temperature estimator module 55 generates the solenoid temperature estimate based on multi-parameter data point arrays from a data acquisition module 57. The vane solenoid 28' is disposed within a temperature controlled thermal chamber 56. The PWM driver module 46 generates a PWM signal based on a commanded duty cycle. The high side driver 48 preferably includes a switching transistor that generates the PWM current signal based on $V_{SUPPLY}$ and the PWM duty cycle.

The low side driver module 50 includes a shunt resistor, through which the current from the vane solenoid 28' flows. The current module 52 measures a voltage drop across the shunt resistor and determines the solenoid current ($I_{SOL}$) based thereon. More specifically, the current module 52 includes an amplifier to scale the read voltage drop across the shunt resistor and $I_{SOL}$ is determined based on the scaled voltage drop.

An ambient temperature ($T_{AMB}$) within the thermal chamber 56 can be regulated to heat or cool the vane solenoid 28' to mimic ambient temperature conditions that the vane solenoid 28 may experience within the engine system 10. A temperature sensor 58 is positioned within the thermal chamber 56 in proximity to the coil windings (not shown) inside the vane solenoid 28' and generates a temperature signal indicating a solenoid temperature ($T_{SOL}$). The data acquisition module 57 receives data signals from the voltage supply 54, the lab-based driver 44 and the temperature sensor 58. More particularly, the data acquisition module 57 receives a voltage signal from the voltage supply 54 and the temperature signal from the temperature sensor 58. The data acquisition module 57 also receives the commanded PWM duty cycle signal from the PWM driver module 46 and $I_{SOL}$ from the current module 52.

The solenoid temperature estimator is created based on multiple data entries collected by the data acquisition module 57. More particularly, each data point is a multi-parameter array including $I_{SOL}$, $T_{SOL}$, $V_{SUPPLY}$ and the PWM duty cycle signal value ($X_{PWM}$). Multiple data points are generated for various scenarios. $T_{AMB}$, $V_{SUPPLY}$, $I_{SOL}$ and $X_{PWM}$ are set and a first data point is determined after each of the signals and $T_{SOL}$ achieve steady-state. Steady-state is defined as a minimum variance over a threshold period of time. Once steady-state is achieved, the data point is recorded by the data acquisition module 57 as a multi-parameter array and $T_{AMB}$, $V_{SUPPLY}$, $I_{SOL}$ and $X_{PWM}$ are reset to achieve another steady-state reading. This process is repeated to provide a plurality of steady-state data points that represent the various operating conditions the vane solenoid 28 may experience. The data acquisition module 57 outputs the multi-parameter arrays to the temperature estimator module 55. The temperature estimator module 55 generates the solenoid temperature estimator.

The solenoid temperature estimator can be provided as a look-up table. In the case of a look-up table, the temperature estimator module 55 generates the look-up table based on the data points provided by the data acquisition module 57. More specifically, a multi-dimensional look-up table is generated based on the multi-parameter arrays of the data points. In this manner, the look-up table provides $T_{EST}$ based on $V_{SUPPLY}$, $I_{SOL}$ and $X_{PWM}$. In other words, $T_{EST}$ is equal to $T_{SOL}$ that was indicated for the particular $V_{SUPPLY}$, $I_{SOL}$ and $X_{PWM}$.

Alternatively, the solenoid temperature estimator can be provided as an equation characterized as:

$$T_{EST} = f(V_{SUPPLY}, I_{ISOL}, X_{PWM})$$

The equation can be derived using a polynomial data fitting technique including, but not limited to, the objective least squares method. In this manner, $T_{EST}$ is calculated for a given $V_{SUPPLY}$, $I_{SOL}$ and $X_{PWM}$.

Although the temperature estimator system 42 is generally described in terms of physical components, it is anticipated that the temperature estimator system 42 can be a virtual system. More specifically, the temperature estimator system 42 can be programmed as a computer-based simulator. In such a case, the components of the temperature estimator system 42, including the vane solenoid 28', are software-based models. The virtual temperature estimator system creates the solenoid temperature estimator based on input data (i.e., $T_{SOL}$, $V_{SUPPLY}$, $I_{SOL}$ and $X_{PWM}$) and the models process the input data.

Figure 3:
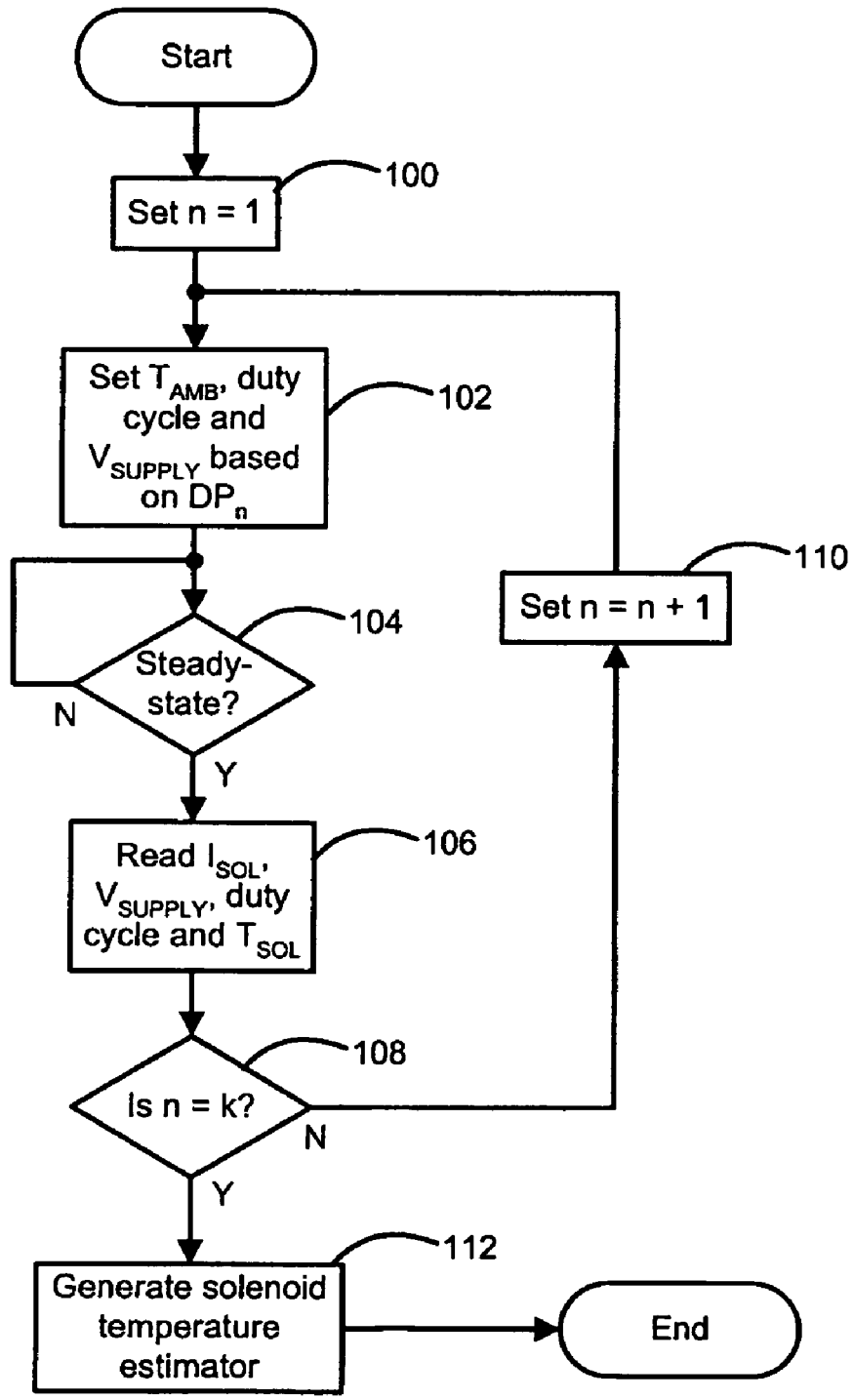
FIG. 3 is a flowchart illustrating steps of creating the solenoid estimator according to the present invention.

Referring now to FIG. 3, the temperature estimator creation process will be described in further detail. In step 100, n is set equal to 1. In step 102, $T_{AMB}$, the duty cycle and $V_{SUPPLY}$ are set based on a desired data point ($DP_n$). $DP_n$ is a single data point in a set of data points (n=1 . . . k) that represent the operating conditions that the vane solenoid may experience. It is determined whether the operating characteristics (e.g., $T_{AMB}$, duty cycle, $V_{SUPPLY}$, $I_{SOL}$ and $T_{SOL}$) are at steady-state (i.e., relatively constant for a threshold time) in step 104. If the operating characteristics are not at steady-state, step 104 is repeated until the operating characteristics achieve steady-state. If the operating characteristics are at steady-state, $T_{SOL}$, $I_{SOL}$, $V_{SUPPLY}$ and PWM duty cycle are read in step 106.

In step 108, it is determined whether n is equal to k (k=the last data point in the set of data points). If k is not equal to n, n is set equal to n+1 in step 110 and the process is repeated from step 102. If n is equal to k, the solenoid temperature estimator is generated in step 112 and the process ends.

Figure 4:
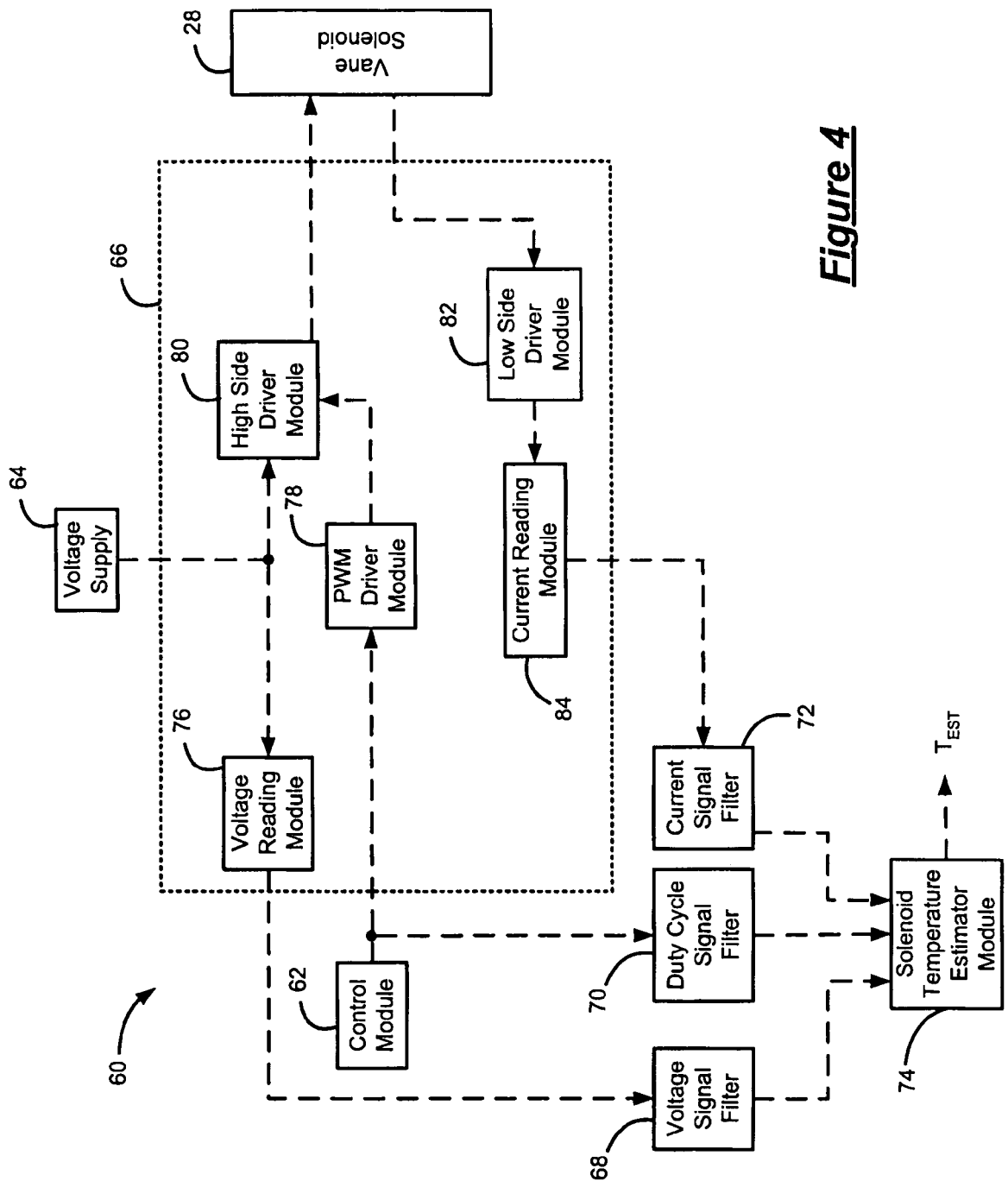
FIG. 4 is a block diagram schematically illustrating a vehicle-based solenoid driver that provides signals to the solenoid temperature estimator.

Referring now to FIG. 4, an in-vehicle solenoid temperature estimator system 60 includes a control module 62, a voltage supply 64, a solenoid driver 66, a voltage signal filter 68, a duty cycle signal filter 70, a current signal filter 72 and a solenoid temperature estimator module 74. The solenoid driver 66 includes a voltage reading module 76, a pulse-width modulation (PWM) driver module 78, a high side driver module 80, a low side driver module 82 and a current module 84. The voltage supply 64 supplies a voltage ($V_{SUPPLY}$) to the solenoid driver 66, which generates a PWM current signal to the vane solenoid 28. The PWM driver module 78 converts the commanded PWM duty cycle signal from the control module 62 to a PWM pulse-train that is used to modulate the high side driver module 80. The high side driver 80 preferably includes a switching transistor that generates the PWM current signal based on $V_{SUPPLY}$ and the PWM pulse-train from the PWM driver module 78. The low side driver module 82 includes a shunt resistor, through which the current from the vane solenoid 28 flows. The current reading module 84 measures a voltage drop across the shunt resistor and determines $I_{SOL}$ based thereon. More specifically, the current reading module 84 includes an amplifier to scale the read voltage drop across the shunt resistor and $I_{SOL}$ is determined based on the scaled voltage drop.

The voltage signal filter 68 receives a voltage signal indicating $V_{SUPPLY}$ from the voltage reading module 76. The duty cycle signal filter 70 receives a duty cycle signal indicative of the commanded PWM duty cycle from the control module 62. The current signal filter 72 receives a current signal indicative of $I_{SOL}$ from the current reading module 84. The filters are preferably digital signal processing (DSP) filters that provide resultant signals having a similar dynamic response to a step change for a given input (e.g., the voltage signal, the duty cycle signal and the current signal). For example, if the commanded duty cycle steps from 50% to 60%, $I_{SOL}$ may ramp from 1.0A to 1.2A. The filters are designed to cause the resultant signals from the filters to ramp up at the same rate (i.e., duty cycle ramps from 50% to 60% in Y seconds and $I_{SOL}$ ramps from 1.0A to 1.2A in Y seconds).

Although the filter design details are outside of the scope of the present invention, it is anticipated that the filters are application specific and are based on models and/or dynamic test data to account for dynamic electrical and/or software responses of the various modules and the dynamic electrical response from the vane solenoid 28. It is also anticipated that the filters are designed to include resultant signals based on initial conditions. For example, the filters can generate resultant signals that would provide a default temperature (e.g., a coolant temperature) from the solenoid temperature estimator module 74. This would occur for a threshold period (e.g., 1 second) after start-up. After the threshold period, the filters provide resultant signals based on the signals provided to each filter. In this manner, erroneous temperature estimates at start-up can be avoided.

Figure 5:
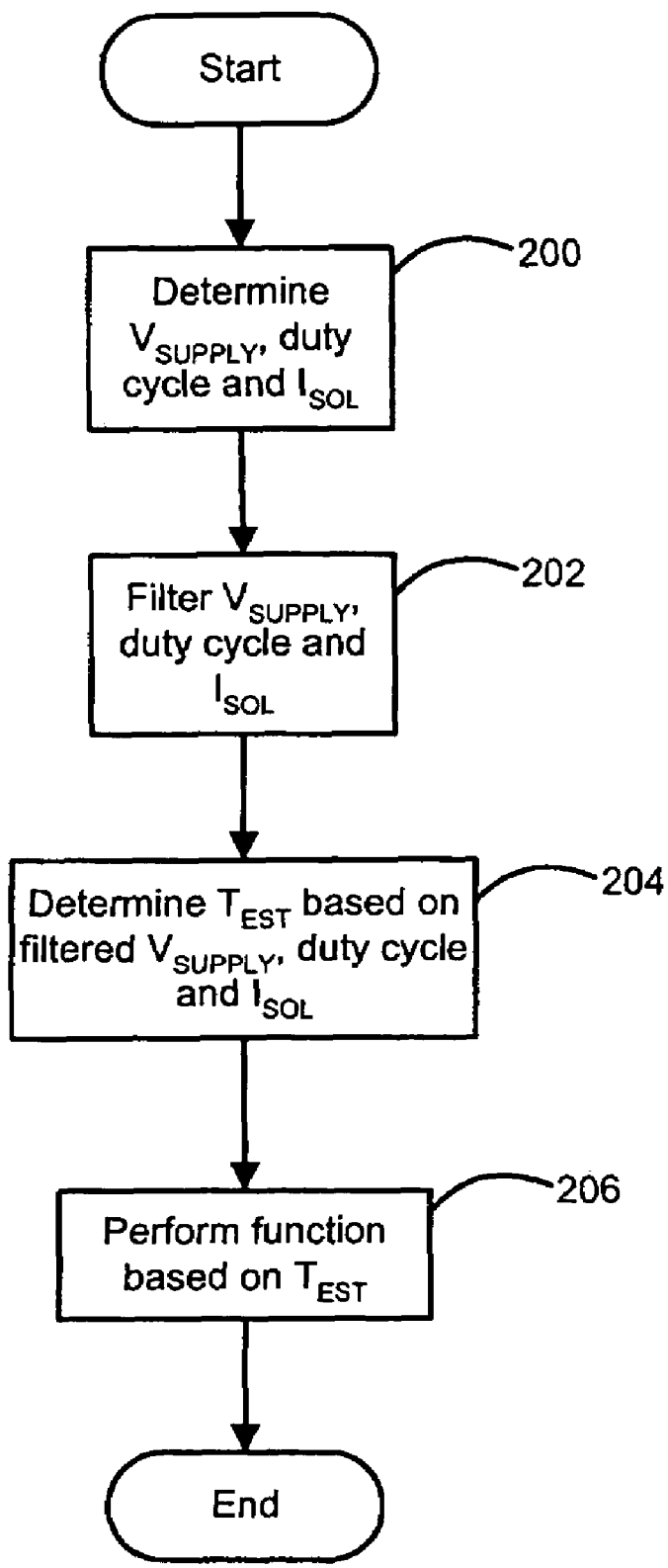
FIG. 5 is a flowchart illustrating a vehicle control method based on an solenoid temperature estimate.

Referring now to FIG. 5, a vehicle control method based on $T_{EST}$ will be described in detail. In step 200, $V_{SUPPLY}$, the duty cycle and $I_{SOL}$ are determined. $V_{SUPPLY}$, the duty cycle and $I_{SOL}$ are filtered in step 202. In step 204, $T_{EST}$ is determined based on the filtered $V_{SUPPLY}$, duty cycle and $I_{SOL}$. More specifically, the filtered VsuppLy, duty cycle and $I_{SOL}$ can be used to reference a multi-dimensional look-up table to determine $T_{EST}$, as described in detail above. Alternatively, the filtered $V_{SUPPLY}$, duty cycle and $I_{SOL}$ can be processed through an equation to determine $T_{EST}$, as described in detail above.

In step 206, a function is performed based on $T_{EST}$ and the control method ends. The function can include, but is not limited to, diagnostics, overheat protection, control adjustment and/or further temperature prediction. More specifically, diagnostics that account for vane solenoid temperature can be executed to monitor proper operation of the turbo 18 and/or engine 12. Additionally, turbo operation or current to the vane solenoid 28 can be limited to prevent overheating of the turbo 18 and/or the vane solenoid 28. Further, other temperatures can be estimated using $T_{EST}$. For example, a temperature of the turbo 18 as a whole can be determined using $T_{EST}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of generating a solenoid temperature estimator, comprising:
   determining a plurality of multi-parameter data points each of which has parameters including an ambient temperature, a supply voltage and a pulse-width modulation (PWM) signal;
   operating said solenoid based on each of said multi-parameter data points;
   recording steady-state temperature values of said solenoid for each of said plurality of multi-parameter data points; and
   generating said solenoid temperature estimator based on said steady-state temperature values and said plurality of multi-parameter data points.

2. The method of claim 1 wherein said parameters further include a solenoid current.

3. The method of claim 1 wherein said step of generating said solenoid temperature estimator includes populating a look-up table based on a multi-parameter array including said steady-state temperature values and said multi-parameter data points.

4. The method of claim 1 wherein said step of generating said solenoid temperature estimator includes deriving an equation based on a multi-parameter array including said steady-state temperature values and said multi-parameter data points.

5. The method of claim 1 wherein said step of operating said solenoid comprises:
   generating a current signal based on said supply voltage and said PWM signal; and
   directing said current signal through said solenoid.

6. The method of claim 1 further comprising heating said solenoid.

7. The method of claim 1 further comprising cooling said solenoid.

8. A method of creating a solenoid temperature estimator, comprising:
   operating a solenoid based on a data point including a plurality of operating parameters;

determining a temperature of said solenoid;

recording steady-state values for said temperature and each of said plurality of operating parameters;

generating said solenoid temperature estimator based on said steady-state values; and wherein said step of generating said solenoid temperature estimator includes one of populating a look-up table based on a multi-parameter array including said steady-state values and deriving an equation based on a multi-parameter array including said steady-state values.

9. The method of claim 8 wherein said operating parameters includes a solenoid current and a supply voltage.

10. The method of claim 9 wherein said operating parameters further include a pulse-width modulation (PWM) signal.

11. The method of claim 8 wherein said step of operating said solenoid comprises:

generating a current signal based on a supply voltage and a PWM signal; and directing said current signal through said solenoid.

12. The method of claim 8 further comprising heating said solenoid.

13. The method of claim 8 further comprising cooling said solenoid.

14. A turbo system, comprising:

a solenoid that is regulated based on a current signal to adjust an output of said turbo system;

a driver module that generates a PWM duty cycle signal, wherein said current signal is based on said PWM duty cycle signal and a voltage signal; and a temperature estimator module that estimates a temperature of said solenoid based on said current signal, said voltage signal and said PWM duty cycle signal, wherein said temperature estimator module implements a look-up table to determine said temperature.

15. The turbo system of claim 14 further comprising a voltage reading module that generates said voltage signal based on a voltage supply to said turbo system.

16. The turbo system of claim 14 further comprising a current reading module that generates said current signal.

17. The turbo system of claim 14 further comprising a filter that filters said voltage signal prior to processing of said voltage signal by said temperature estimator module.

18. The turbo system of claim 14 further comprising a filter that filters said PWM duty cycle signal prior to processing of said PWM duty cycle signal by said temperature estimator module.

19. The turbo system of claim 14 further comprising a filter that filters said current signal prior to processing of said current signal by said temperature estimator module.

* * * * *